June 18, 1963 A. S. WESTNEAT, JR., ETAL 3,094,692
STATISTICAL TELEMETERING
Filed Oct. 1, 1958
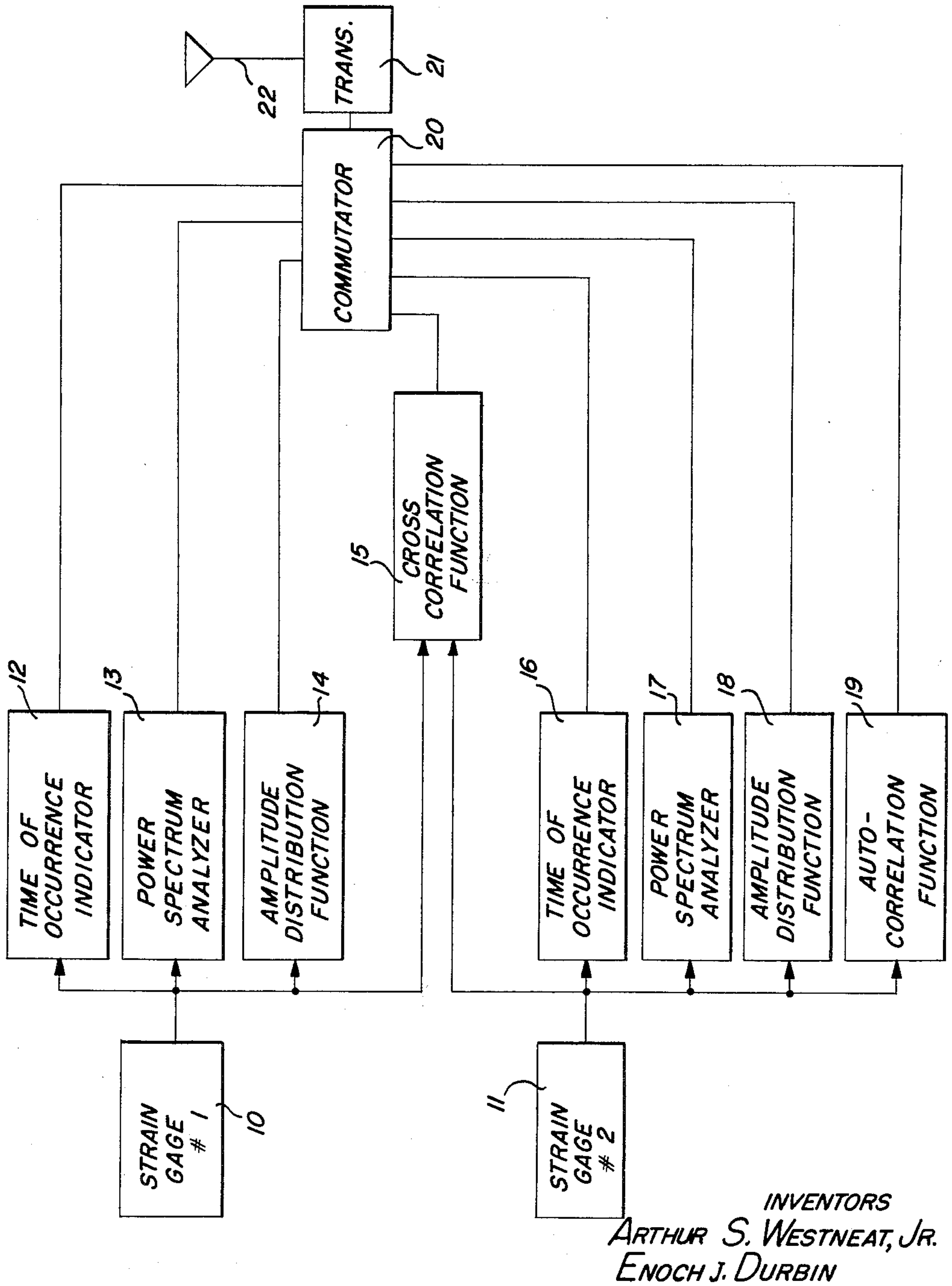
INVENTORS
ARTHUR S. WESTNEAT, JR.
ENOCH J. DURBIN
BY Hurvitz & Rose
ATTORNEYS United States Patent Office 3,094,692

Patented June 18, 1963

3,094,692

STATISTICAL TELEMETERING

Arthur S. Westneat, Jr., Rocky Hill, and Enoch J. Durbin, Princeton, N.J., assignors, by mesne assignments, to Electro-Mechanical Research, Inc., Sarasota, Fla., a corporation of Connecticut Filed Oct. 1, 1958, Ser. No. 764,566
17 Claims. (Cl. 340—345)

The present invention relates generally to novel systems of telemetering, and more particularly to systems for transmitting statistical data pertaining to measured quantities in a telemetering system rather than to the quantities themselves.

The radio-frequency spectrum assigned, for example, to missile telemetering is becoming increasingly crowded. One reason for the overcrowding of telemetering channels is that available bandwidth is not being used to best advantage. As high as ninety percent of the telemetering channels are devoted to relatively slowly varying data which occupies about ten percent of the required bandwidth; whereas only about ten percent of the channels are devoted to relatively high-frequency data.

In addition, under present procedures telemetered data is transmitted as measured to be recorded at ground stations for future analysis. This procedure introduces long delays in arriving at conclusions following a test.

In accordance with the present invention, high frequency data taken in a missile, or the like, is analyzed in the missile; statistical data is derived in the missile as a result of the analysis, and the statistical data is transmitted. There results an enormous saving in bandwidth since the statistical data varies slowly and is therefore narrow bandwidth data. Moreover, since the data is transmitted after analysis, ground recorders receive directly usable data, and data processing following recording may be obviated or radically reduced.

Since the data as transmitted by the present system is slowly varying, it may be transmitted on a time sharing basis and thereby tremendous reduction of bandwidth is feasible, as well as reduction of space and weight, as by reduction of necessary transmitters to one.

When typical high-frequency data is studied, it becomes apparent that it can be considered as a random function. The most significant characteristic of a random function is that it is impossible to predict its future from its past. When random or near-random functions are presented as time-amplitude functions, the significance of the functions is difficult of ascertainment, especially in the presence of noise or large fluctuations. Hence, as to such functions the validity of telemetering and recording time histories is questionable. Random functions have been analyzed by generalized harmonic analysis, with success, and more specifically by deriving correlation functions, amplitude probability distributions, and power spectral density plots. In most cases these characteristics vary slowly with time, although the original data may vary rapidly. It follows that transmission of the random function itself, requiring a wide frequency band, is of doubtful utility. On the other hand, transmission of the useful data derivable from the random function, i.e. the statistical information content thereof, requires only a narrow band width, and is economical of band width.

To provide an example, we may assume that the frequency of oscillation of a missile component is under study, and that this frequency is relatively high. Unless this frequency is changing rapidly, transmission thereof is wasteful because it involves transmission of redundant data. The power spectrum of the signal or its auto-correlation function, on the other hand, will quickly reveal periodicities, and these may be transmitted as narrow band signals.

In accordance with the present invention, telemetered random data is transmitted in the form of three primary statistical characteristics of the data:

(1) Power spectral density
(2) Correlation functions, and
(3) Amplitude probability distribution.

In addition, times of occurrence of phenomena of interest are also transmitted.

A power spectrum analyzer obtains the "power spectral density function." This function contains signal frequency information. It is a measure of average power available at each frequency present in the signal under study. It is a plot of average power vs. frequency taken over a relatively long time interval. For the case of a signal containing a wide range of frequencies, the power spectral density function can also be used to calculate the auto-correlation function, because a power spectrum analyzer is simpler to design than a correlator. For most signals of practical interest, the power spectral density varies at a low rate.

The second parameter, "the correlation function," is derived from the output of a correlator. The correlation function is a measure of the randomness of the signal. It describes, at a given time how far into the future the signal can be predicted. The correlator is used primarily for deriving "cause and effect" data showing how two different variables are related. Unless both variables are present, the correlator output is zero. Thus, the use of a correlator, or of a correlator with a commutator, reduces the number of different variables which are required to be transmitted. If the data is changing slowly, many variables may be commutated. Thus, more data may be transmitted by the system. Another use of the correlation function may be to calculate the power spectral density when signals containing a narrow range of frequencies are encountered, as in servo systems.

The "amplitude probability distribution function" is obtained from an amplitude distribution analyzer. The output of this device is a plot of amplitude distribution over a period of time. That is, with amplitude plotted as the abscissa, the height of the ordinate represents the density of a given amplitude in the signal. This function is used to ascertain the nature of the process which causes the signal under study. It defines the random function, i.e. determines whether a certain missile member is affected randomly or casually and what part of the signal is noise.

In summary, transmission of statistical data derived from measured data which represents a random time function results in conservation of telemetering bandwidth and reduces the number of transmitters required, so that lighter telemetering equipment may be employed to handle a given quantity of data, and data is transmitted in meaningful form, shortening data reduction time.

The several devices employed for deriving the statistical quantities referred to above may be of known form, or may correspond with the disclosures of applications for United States patent filed concurrently herewith, assigned to the same assignee as the present application, and identified as follows:

Marcus Lewinstein and William G. Harries, Serial No. 764,568, Amplitude Distribution Telemetering;

Lloyd M. Germain, Serial No. 764,567, Amplitude Density Probability Computer;

Marcus Lewinstein and William G. Harries, Serial No. 764,606, Time of Occurrence Transmitter;

Alfred G. Ratz, Serial No. 764,569, Power Spectrum Telemetry, and now Patent No. 3,035,228;

Lloyd M. Germain, Serial No. 764,607, Time of Occurrence Telemetering.

The specific devices disclosed in the above identified applications for U.S. patent represent preferred embodiments only, and are not intended to be exclusively employed in the practice of this invention.

It is, accordingly, a broad object of the invention to provide a novel system of telemetering.

It is another object of the invention to provide a system of telemetering in terms of transmitted statistical quantities, derived from measured data, instead of the latter data itself.

It is still another object of the present invention to provide a system of telemetering by transmission of power spectra.

It is a further object of the invention to provide a system of telemetering by transmission of correlation functions.

It is a further object of the invention to provide a system of telemetering by transmission of amplitude distributions.

It is still another object of the invention to provide a system of telemetering for transmitting combinations of statistical data derived from one or more transducers which provide correlated information, on a time-sharing basis, over relatively narrow channels.

It is a broad object of the invention to provide a system of narrow band telemetering in which wide band data is analyzed for statistically significant narrow band data, and the latter transmitted on a time-sharing basis by means of a single transmitter.

The above and still further objects, features and advantages of the present invention will become apparent upon consideration of the following detailed description of one specific embodiment thereof, especially when taken in conjunction with the accompanying drawings, wherein:

The single figure of the drawings is a block diagram of a system according to the present invention.

Referring now more particularly to the accompanying drawings, the reference numeral 10 denotes a first strain gage and the reference numeral 11 a second strain gage. It is assumed that the gages are part of a missile telemetering system, and are measuring the vibrations of two members, that the members are so mechanically coupled that vibration of one is or may be communicated to the other, and that at some time in the test either or both members may fail, which would be indicated by an excessive strain gage output pulse.

The strain gage 10 is coupled via suitable wide band amplifiers (not shown) in parallel to a time of occurrence indicator 12, a power spectrum analyzer 13, an amplitude distribution computer 14 and one input of a cross-correlator 15.

The strain gage 11 is coupled via suitable amplifiers, not shown, to the remaining input terminal of cross-correlator 15 and to a time of occurrence indicator 16, a power spectrum analyzer 17, an amplitude distribution computer 18 and an auto-correlator 19.

The elements 12–19, inclusive, feed into separate contacts of a single commutator 20, which are sensed in succession, and the output of the commutator is transmitted over a narrow band radio link including transmitter 21 and antenna 22.

The time of occurrence indicators 12 and 16 provide output signals, at times when the outputs of strain gages 10 and 11, respectively, attain an excessive output, as in response to failure of a member.

The cross-correlation function computer 15 provides a signal representative of the extent to which the strains measured by strain gage 10 are communicated to strain gage 11, or vice versa. In a given test, for example, the member to which strain gage 11 is secured may be per se subject to vibration, and be further subject to vibration communicated to it from several other members. It is then desired to isolate the effects on the member to which gage 11 is secured of vibration communicated from each of the other members. If the latter are individually monitored for strain, the effect of one or another can be determined or measured in terms of cross-correlation.

The spectrum analyzer and amplitude distribution plots are individual to the separate gages and provide information of significant frequencies of vibration, and of amplitude ranges covered by the vibrations, on a statistical basis. The auto-correlator 19 provides information concerning periodicities in functions, where the periodicities are masked by large random effects.

It will be appreciated that the selection of strain gages as transducers is relatively arbitrary since other telemetering transducers may be employed. Nor need the telemetering set-up be limited to two transducers nor to transducers of the same type, at each position of the systems.

While I have described and illustrated one specific embodiment of the present invention, it will become apparent that variations of the specific details of construction may be resorted to without departing from the true spirit and scope of the invention as defined in the appended claims.

What is claimed is:

1. A system of telemetry comprising a first transducer, a second transducer, a cross-correlation function computer having two input terminals and an output terminal, means connecting said first transducer to one of said input terminals, means connecting said second transducer to the other one of said input terminals, a commutator, means connecting said output terminal in cascade with said commutator, and a radio transmitter for transmitting signals provided by said commutator.

2. A system of radio telemetry, comprising a transducer providing a time function in the form of an electrical signal, a time of occurrence measuring device, a power spectrum analyzer, an amplitude distribution function computer, an auto-correlation function computer, means coupling said time of occurrence measuring device, said power spectrum analyzer, said auto-correlation function computer and said amplitude distribution function computer to said transducer in parallel, whereby said electrical signal is translated simultaneously and in separate channels into statistical signals representative of a time of occurrence signal, a frequency spectrum signal representative of said electrical signal, a further signal representing amplitude distribution of said electrical signal, and an auto-correlation function representative signal, a multiple input single output commutator arranged to sample signals in sequence applied thereto in parallel, a radio transmitter connected to said single commutator output for transmitting signals provided by said commutator, and means applying to said multiple inputs of said commutator in parallel said time of occurrence signal, said frequency spectrum signal, said further signal and said auto-correlation function representative signal.

3. A system of telemetry comprising a first transducer, a second transducer, a first cross-correlation function computer having two input terminals and an output terminal, separate further statistical function computers connected to each of said first and second transducers, each of said further computers having an output terminal, a commutator having plural input terminals, and means connecting said output terminals one for one with said input terminals of said commutator, and a radio transmitter coupled to said commutator for transmitting signals provided by said commutator.

4. A system of telemetry comprising a first transducer, a second transducer, a cross-correlation function computer having two input terminals and an output terminal, means connecting said first transducer to one of said input terminals, means connecting said second transducer to the other of said input terminals, a first time of occurrence computer connected to said first transducer, a second time of occurrence computer connected to said second transducer, each of said time of occurrence computers having an output terminal, a commutator having plural input terminals, means connecting said output terminals in parallel to separate ones of said input terminals of said commutator, and a radio transmitter coupled to said commutator for transmitting signals provided by said commutator.

5. In a telemetry system, a pair of correlated transducers, means responsive to said transducers for computing a cross-correlation function of the outputs of said transducers, means responsive to one of said transducers for computing the auto-correlation function of the output of said one of said transducers, and means for transmitting said cross-correlation function and said auto-correlation function to a remote location on a time sharing basis.

6. A system of telemetering comprising a transducer providing random data signals having a frequency spectrum extending over a relatively wide band with, a frequency scanning power spectrum analyzer having an input and an output terminal, and further having a scanning range extending entirely over and for every frequency of said relatively wide band width, said spectrum analyzer being arranged to provide relatively narrow band output signals at said output terminal in response to said wide band width spectrum of said data signals, said narrow band output signals containing substantially all the spectral informational content of said spectrum, means connecting said transducer to said input terminal, a multiple contact commutator, means connecting one contact of said commutator to said output terminal, and a radio link coupled to said commutator for transmitting to a remote location on a time division basis signals derivable from said commutator, said radio link having a relatively narrow band width capable of efficiently transmitting said narrow band output signals, whereby the spectral informational content of said data signals is transmitted over a relatively narrow band radio link.

7. The system according to claim 6 wherein is further provided a time of occurrence computer, said time of occurrence computer being arranged to compute a continuous steady state signal having a steady state characteristic representative accurately of the time of occurrence of a random transient event, wherein said random transient event occurs sufficiently rapidly to require a relatively wide band width for its accurate representation and wherein said continuous steady state signal requires not more than said relatively narrow band width, said time of occurrence computer having an output terminal connected to another contact of said commutator.

8. A system of telemetering comprising at least one transducer providing random data signals having a frequency spectrum extending over a relatively wide band width in response to a sensed condition, a plurality of statistical function computers each having an input circuit and an output circuit, said statistical function computers being of diverse mathematical types and effecting computations according to diverse mathematical principles and providing output signals of diverse mathematical types, each of said statistical function computers being arranged to provide relatively narrow band output signals in response to said data signals, each of said relatively narrow band output signals containing substantially all the statistically significant informational content of said data signals pertaining to its mathematical type; a commutator having a plurality of input contacts and at least one output contact, means connecting said output circuits one for one to said input contacts; a radio transmitter coupled to said output contact, said transmitter having a relatively narrow band width capable of efficiently transitting said narrow band output signals, whereby the informational content of said data is transmitted on a time-sharing basis as diverse narrow band signals of diverse mathematical types, each narrow band signal conveying substantially all the statistically significant informational content of said relatively wide band data on a relatively narrow band basis.

9. The system according to claim 8 wherein said statistical function computers include at least two of a scanning spectrum, an auto-correlator, and an amplitude distribution function computer.

10. The system according to claim 8 wherein said statistical function computers include at least a time of occurrence computer, said time of occurrence computer being arranged to compute a continuous steady state signal having a steady state characteristic representative accurately of the time of occurrence of a random transient event, wherein said random transient event occurs sufficiently rapidly to require a relatively wide band width for its accurate representation and wherein said continuous steady state signal requires not more than said relatively narrow band width.

11. The system according to claim 8 wherein said statistical function computers include at least a time of occurrence computer, said time of occurrence computer being arranged to compute a continuous steady state signal having a steady state characteristic representative accurately of the time of occurrence of a random transient event, wherein said random transient event occurs sufficiently rapidly to require a relatively wide band width for its accurate representation and wherein said continuous steady state signal requires not more than said relatively narrow band width, and wherein said statistical function computers, further include a power spectrum analyzer, and an amplitude distribution function computer.

12. The system according to claim 8 wherein at least one of said statistical function computers is a power spectrum analyzer of the type providing a continuous and sequential scan over the frequencies in said spectrum.

13. The system according to claim 8 wherein said statistical function computers include a time of occurrence computer, said time of occurrence computer being arranged to compute a continuous steady state signal having a steady state characteristic representative accurately of the time of occurrence of a random transient event, wherein said random transient event occurs sufficiently rapidly to require a relatively wide band width for its accurate representation and wherein said continuous steady state signal requires not more than said relatively narrow band width, said statistical function computers further including at least two of a scanning power spectrum analyzer, an amplitude distribution function computer and an auto-correlation function computer.

14. The system according to claim 8 wherein at least one of said statistical function computers is an auto-correlation function computer.

15. The system according to claim 8 wherein said transducer is a strain gage securable in transducing relation to an element of a missile.

16. A system for telemetering the output of a transducer secured in transducing relation to an element at a remote location, said transducer providing a data signal requiring a frequency spectrum extending over a wide band for its transmission, a statistical function computer, said statistical function computer being arranged to provide relatively narrow band output signals in response to said data signal, said narrow band output signals containing all the statistically significant informational content derivable from said data signal, commutator means for sampling said output signals periodically over relatively short time intervals, and a radio transmitter connected to said means for transmitting the sampled signals, said radio transmitter having a relatively narrow band width capable of efficiently transmitting said sampled signals, whereby the statistical informational content of said data signal is transmitted on a time-sharing basis as narrow band signals containing substantially all the statistically significant informational content of said data signal.

17. The combination according to claim 16 wherein said transducer is a strain gage.

References Cited in the file of this patent

UNITED STATES PATENTS

| | | |
|---|---|---|
| 2,098,956 | Dudley | Nov. 16, 1937 |
| 2,445,840 | Rauch | July 27, 1948 |
| 2,487,778 | Atlas | Nov. 15, 1949 |
| 2,562,109 | Mathes | July 24, 1951 |
| 2,760,369 | Vanater | Aug. 28, 1956 |
| 2,890,285 | Bogert et al. | June 9, 1959 |
| 2,907,400 | Swafford | Oct. 6, 1959 |
| 2,908,761 | Raisbeck | Oct. 13, 1959 |
| 2,915,897 | Hoffmann | Dec. 8, 1959 |